(12) United States Patent
Cao et al.

(10) Patent No.: US 7,644,074 B2
(45) Date of Patent: Jan. 5, 2010

(54) SEARCH BY DOCUMENT TYPE AND RELEVANCE

(75) Inventors: Yunbo Cao, Beijing (CN); Hang Li, Beijing (CN); Jun Xu, Tianjin (CN)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 11/275,326

(22) Filed: Dec. 22, 2005

(65) Prior Publication Data

US 2007/0150472 A1     Jun. 28, 2007

(51) Int. Cl.
G06F 17/30     (2006.01)

(52) U.S. Cl. .......................................................... 707/5

(58) Field of Classification Search .................. 707/100
See application file for complete search history.

(56) References Cited

U.S. PATENT DOCUMENTS

| 2005/0182783 | A1* | 8/2005 | Vadai et al. | 707/102 |
| 2005/0246314 | A1* | 11/2005 | Eder | 707/1 |
| 2005/0246328 | A1* | 11/2005 | Zhang et al. | 707/3 |
| 2007/0088676 | A1* | 4/2007 | Rail | 707/3 |
| 2007/0124263 | A1* | 5/2007 | Katariya et al. | 706/14 |

* cited by examiner

*Primary Examiner*—Kavita Padmanabhan

(57) ABSTRACT

A method of finding documents. A method of finding documents comprising, ranking documents according to relevance to form a ranked relevance list, ranking documents according to type to form a ranked type list, and interpolating the ranked relevance list and the ranked type list to form a list of documents ranked by relevance and type.

6 Claims, 5 Drawing Sheets

The Link Class

```
/*
**         © COPYRIGHT MIT 1999
**         Please first read the full copyright statement in the file COPYRIGHT.
*/
```

The HTLink class represents links between anchor objects. By keeping the link as a object and not part of the anchor we are capable of handling semantics in a much more organized way. For example, we can then search for link types among all the link objects that we have created. Anchor objects are bound together using Link objects. Each anchor can be the source or destination of zero, one, or more links from and to other anchors.

Link information can com from many places - two classic example are the HTML LINK element and HTTP LINK header field. Libwww supp both – the                              parser and HTTP LINK header field is handled by the MINE parser.

This module is implemented by HTLink.c, and it is a part of the W3C Sample Code Library.

```
#ifndef HTLINK_H
#define HTLINK_H
typedef struct _HTLINK      HTLINK;
```

101

Creating an External Link

To create an anchor that is a link to another document:

1. Select to select (by click and drag or by keyboard) the text for the link you are creating
2. Click the Link button (first case) or select the entry "Create or change link" in the Links menu (second case)
    - In the first case, the cursor changes from an arrow to a hand to let you click the target document.
        - If the target document is displayed in another Amaya window, click anywhere within that window to create the link.
        - If the target document is not displayed in another Amaya window, press the Esc or Delete key, or click a part of the document which cannot be a valid target. A dialog prompts you for the location of the target document. Type the URI of the target document and then Confirm to create the link.
    - In the second case, a dialog prompts you for the location of the target document.
        - If the target document is displayed in another Amaya window and you want to select it by click, click the Click button then click anywhere within that window to create the link.
        - If the target document is not displayed in another Amaya window, type the URI of the target document and then Confirm to create the link.

Compiling Amaya Sources with Autoconf
This document explains how to compile the Amaya environment (schemas compilers and the binary) from the distributed source tree.
Here is the content of this document:
1. Prerequisite
2. How to build
3. More info on the make files
4. More info on the build process
5. If make failed
6. If amaya binary doesn't work

Prerequisite
- It is strongly recommended that you use a GNU make and if possible GNU CC since these are the tools used by the Amaya Team, and very few tests have been done with other flavours of make and C compilers.
- The usual Unix development tools, including at least sed, awk and cpp should be available.
- Amaya requires X-Windows (X11R5 or X11R6). Amaya should work fine with
  - GTK (see What do I need to compile this version ?).
  - OpenMotif (2.1.30-1 and later)
  - see http://rpmfind.net/linux/RPM/linuxPPC/contrib/software/Libraries/X11/openmotif-2.1.30-1.ppc.html
  - or latest versions (0.8.0 and later) of Lesstif (a free Motif clone)

201

Compiling Amaya On Windows
This document explains how to compile the Amaya environment (schemas compilers and the binary) from the distributed source tree. All makefiles are included with the source tar file.
Document Contents
1. Prerequisites
2. Makefiles needed to build Amaya
3. Building Amaya using *.mak or (*.dsw) files
4. Building Amaya using *.dsp files

Prerequisites
- The compiler used by the Amaya development Team is MSVC++ (6.0). Other compilers may work but would require reworking the Makefiles.
- The source tar file should be unzipped with the WinZip Self-Extractor tool that you can download from http://www.winzip.com/
- or JustZIPit a freeware (and easier-to-use) alternative to WinZIP.

Makefiles needed to build Amaya
Check that your directory Amaya\Windows contains the following directories and files:

Macintosh How To's     301

How to print screen on a MAC:
- With the screen up hold down the Command (apple) button-Shift button-and 3 button.
- You will hear a sound of a camera taking a snapshot.
- This picture is stored directly under the drive as "picture", or the # of the picture you have taken.

Then
- Open XL and go to Insert/ Picture/ From File.
- Search for the "Picture1" on the drive and click insert.

How to find out what OS the customer is running:
- First, make sure that there is not a running application open, and that the customer is at the desktop.
- Go to Apple and down to About This Computer.
- The dialog box that appears will tell you what OS the customer is running.

How to get a PID# for Project:
- Start Project.
- Go to Apple and then to About Microsoft Project.
- The dialog box that appears will tell you the version of Project and will also list the PID# for Project.

---

Table of Contents for excerpt     302
- ☐ O. Illustrations, diagrams, maps
- ☐ P. Tables and Charts
- ☐ Q. Graphs

[Excerpted material starts here.]

O. Illustrations, diagrams, maps

- ☐ Describe these if the description will add information not given in the text; frequently the author will have already done the job for you. The amount of information contained in the illustration will determine how detailed your description must be. For figures which do not add materially to the text, merely read the caption.
- ☐ Since all numbered pages must be accounted for, every figure must be mentioned. E.g., "Page 30 shows a portrait of Queen Elizabeth the First of England. Page 31," or, if the figure has a caption, "Page 30 shows a portrait of Queen Elizabeth the First of England, captioned 'Behind the Queen's shoulder can be seen the English galleons sailing triumphantly away from Calais.' Page 31.
- ☐ Describe a figure immediately following the paragraph in which it is first mentioned or at a suitable break in the thought of the text, regardless of where it is actually printed. E.g., "Table 1 appears on page 17." Then read the table in accordance with the directions given below. After reading the table, say, "End of Table 1. Returning to text on page 9."

How to describe a figure
1. Ask yourself, "Why is it there? What does it illustrate or add to the text?" Stress these points and avoid inconsequential details.
2. Consider the grade level of the text in choosing the words you will use in the description. Make comparisons to items with which a blind person will be familiar, e.g., the hand, a baseball, a triangle and the like.

---

How to add a new Mime Type     303

Jigsaw Home / Documentation Overview / Tutorials

The association between mime types and file extensions is managed by the indexers in Jigsaw. For example, the html extension is associated to a FileResource with an HTTPFrame, the content-type of this HTTPFrame is text/html.

So, if you want to add a new extension/mime-type association, you just have to add the new extension in the default indexer under the "extensions" node.

Example: You want to add the xml extension. Add a FileResource associated to an HTTPFrame to the "extensions" node of the "default" indexer. Set the HTTPFrame content-type to text/xml. Now files with xml extension (test.xml for example) will be indexed like that.

For more details on indexers management, read the JigAdmin 2.0 documentation or the JigAdmin 1.0 documentation about indexers.

Jigsaw Team
$Id: mimetype.html,v 1.3 2000/03/10 16:42:30 bmahe Exp $

FIG. 3

SEARCH BY DOCUMENT TYPE AND RELEVANCE

BACKGROUND

This description relates generally to computer aided searching and more specifically to searching for instruction documents.

People often face unfamiliar tasks, and thus they need appropriate instructions for conducting them. Much effort has been made to cope with the problem. Including books for popular 'how-to' questions. Many online services for answering how-to questions are also available which can maintain a large collection of instruction documents and provide a search service on the collection.

However, none of them typically can cover all of the how-to questions in daily life. Thus, it could be helpful to have a system that helps automatically retrieve 'instructions' (i.e., documents of task guides) on the web (either Internet or intranet).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a way to search for manuals or other documents by combining a relevance model and a type model. Training data is provided to each model and the model is then applied to a first plurality of documents. Two collections of documents result. A first collection ranked by type, and a second collection ranked by relevance. Through a linear interpolation the documents are combined to produce a second plurality of documents ranked by relevance and type.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 shows two examples of web documents that may be found in a conventional search.

FIG. 2 shows two exemplary instruction documents found as the result of a conventional search pertaining to the query 'how to compile Amaya'.

FIG. 3 shows examples of documents that might be found as a result of a search.

Like reference numerals are used to designate like parts in the accompanying drawings.

DETAILED DESCRIPTION

Figure 4:
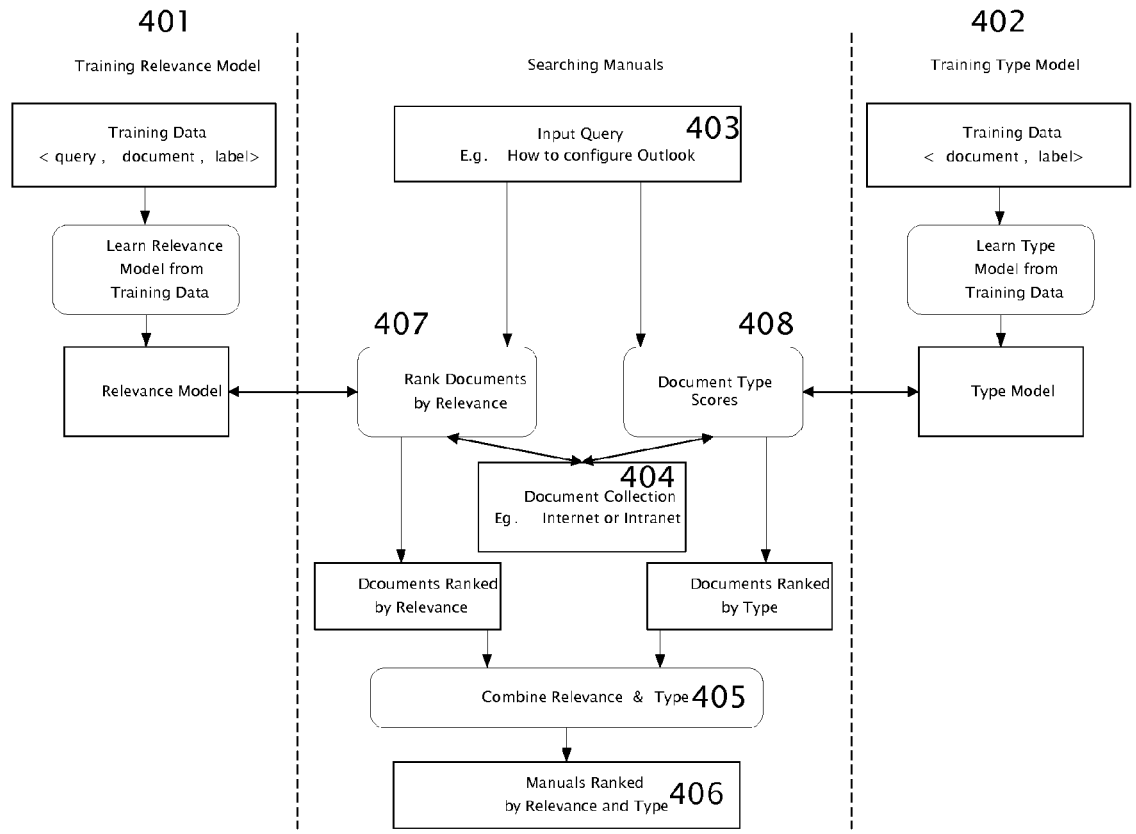
FIG. 4 is a flow diagram showing manuals search by using a relevance model and a type model.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a manuals search by using a relevance model and a type model. Although the present examples are described and illustrated herein as being implemented in an instruction manual search system, the system described is provided as an example and not a limitation. As those skilled in the art will appreciate, the present examples are suitable for application in a variety of different types of search systems.

Traditional information retrieval typically aims at finding relevant documents. However, relevant documents found in this manner are not necessarily instruction documents, i.e., answers to how-to questions. Thus, a naive application of the traditional information retrieval may not produce the desired instructions.

In the following example, investigation of question answering in a new setting is provided by a method called "manuals search". More specifically, given a how-to query, all documents may be automatically retrieved and ranked which are relevant to the query and which are also likely to be an instruction document. In particular the training type manual is interpreted, or seen, as a classification problem. And the method of fusing scores from the type model and the relevance model may be done by linearly interpolating the scores.

The examples below provide a manuals search process typically utilizing a relevance model and a type model. Specifically, when given a 'how-to' type of query (e.g., 'how to create a link'), documents are retrieved and ranked them according to both the likelihood of being an instruction document (a document containing description about how to perform a task) and the relevance to the query. Traditional document retrieval typically only considers the relevance of documents to queries. The method of performing the task may include what may be referred to here as 'relevance model' and 'type model'. With the relevance model, it is determined whether or not a document is relevant to a query. With the type model, it is determined whether or not a document is an instruction document. Okapi and Logistic Regression may be employed as the relevance model and the type model, respectively. A method for combining the uses of the two models based on linear interpolation is also proposed.

In the example provided the method is described in terms of a manuals search. More specifically, given a how-to query, documents which are relevant to the query and which are likely to be instruction documents are retrieved and ranked. The manuals search is based on a relevance model and a type model. Okapi may be employed as the relevance model and Logistic Regression as the type model, respectively. A method based on a linear interpolation technique is also proposed to fuse the output of the relevance model and the type model.

The instant manuals search typically performs well on both artificial data sets and real data sets. For how-to queries, good instruction documents are often ranked higher using the exemplary approach than the baseline method of either solely using Okapi or solely using Logistic Regression. The proposed approach typically performs well on different domains.

The example provided of a method of manuals search may be based on a relevance model and a type model. In particular Okapi may be employed as the relevance model and Logistic Regression as the type model, respectively. Okapi is a system for document retrieval based on a probabilistic model. It retrieves and ranks documents according to the relevance of documents to queries. Okapi or its equivalent may be employed in the example provided. Okapi is described more fully by S. E. Robertson, S. Walker, M. M. Beaulieu, M. Gatford, and A. Payne. Okapi at TREC-4. In D. K. Harman, editor, The Fourth Text Retrieval Conference (TREC-4), pages 73-96, Gaithersburg, Md., 1996. National Institute of Standards and Technology, Special Publication 500-236.

Logistic Regression is a probabilistic classification model more fully described in T. Hastie, R. Tibshirani, and J. Friedman. *The Elements of Statistical Learning*. Springer, N.Y., 2001. In contrast to other classification models such as Support Vector Machine (SVM), Logistic Regression typically outputs probability values rather than scores in classification.

A method based on a linear interpolation technique is also utilized to fuse the output of the relevance model and the type model.

A manuals search may be more helpful than a conventional search that tends to return a greater range of results, many of which are not instructions. In performing a manuals search a query is typically received first. The query is usually a how-to question, e.g., 'how to create a link'. Next using conventional methods automatic retrieval of all of the relevant and likely instruction documents is performed. Next, the documents may be ranked according to the degree of likelihood of being an instruction document and the degree of relevance to the query.

Manuals search typically needs to assure that the retrieved documents are relevant to the queries as well. However, in contrast, manuals search may also need to assure that the retrieved documents are instruction documents. Table 1 shows possible sets of documents that may be searched for. From Table 1, A is the set that is typically desired in manuals search. C is the set that is relevant but non-instruction and thus should be filtered out.

TABLE 1

Two views of documents

|  | Relevant | Irrelevant |
| --- | --- | --- |
| Instruction | A | B |
| Non-instruction | C | D |

FIG. 1 shows two examples of web documents that may be found in a conventional search. The first document 101 is not an instruction document and the second document 102 is an instruction document. Thus, if the query is 'how to create a link', then the second document 102 would be preferred by users. However, if only relevance is considered, then the first document 101 will likely be ranked higher, because it would typically appear to be more relevant to the query. Question answering may be ideal for accessing information on instructions, if realized, because its goal is to provide a single combined answer. One can simply get all the necessary information by reading the combined answer. However, generation of such a combined answer may be very challenging or even impossible for current systems. First, most answers to a how-to query consist of step-by-step guides as the example shown in the second document in FIG. 2. Deletions, insertions, or re-orderings made in any part of the document may confuse or misguide typical searches. Second, different instruction documents may have different assumptions and settings, even for the same topic. Thus it may not be appropriate to combine the instructions based on different assumptions and settings.

FIG. 2 shows two exemplary instruction documents found as the result of a conventional search pertaining to the query 'how to compile Amaya'. However, they provide instructions for different settings. One document 201 provides instructions 'with Autoconf' settings. The other document 202 provides instructions with Windows' settings. Therefore, a reasonable approach would be to show users the instruction documents separately.

As seen above judging whether a document is a relevant instruction document, and thus can be used as an answer to a how-to query in an objective way may be hard. However, we can still provide relatively objective guidelines for the judgment. The objective guidelines will be termed the specification in this following description. The specification may be used extensively for development and evaluation of the manuals search process. As previously shown in Table 1, the specification can be designed from two view points. For the notion of relevance, specification may be defined in a similar fashion as that in traditional information retrieval. In doing so the notion of instruction is clarified first.

FIG. 3 shows examples of documents 301 302 303 that might be found as a result of a search. First, an instruction document is a document created for answering a how-to query. More specifically, by reading the document, one can understand how to perform the task of the how-to query. Second, in the example provided, an instruction document is assumed not to be a document containing instructions for a number of different tasks. For example, the first document in FIG. 4 is not regarded as an instruction document. Third, in the example provided, an instruction document is assumed not to be a document that only consists partly of instructions.

For example, the second document 302 is not viewed as an instruction document, because a section of it is about how-to. As can be seen from the above discussion some instruction documents may contain step-by-step guides (cf., the second document in FIG. 2); while other instruction documents may just consist of several sentences (e.g., the last document in FIG. 4).

The criteria used above may be quantified for use in a manuals search. With the specification defined above, four labels similar to those in Table 1 are provided. For the purposes of manuals search, however, there should be no difference between the labels C and D. Thus, we combine C and D together to C-D. In manuals search, given a query q and a document d, one of the three labels below can be assigned:

A: document d is relevant to q and is an instruction document

B: document d is irrelevant to q but is an instruction document

C-D: document d is of no use

FIG. 4 is a flow diagram showing manuals search by using a relevance model 401 and a type model 402. In the example provided of manuals search by using a relevance model and a type model the input may be a query 403 and a collection of documents 404. The documents may have resulted from a conventional search, or may simply be a collection of documents to be examined. The exemplary approach to manuals search includes two steps. First, a representation to relevance to a query and a likelihood of being an instruction document is formed with two sub-models, which we call a 'relevance model' 401 and a 'type model' 402, respectively. In the relevance model, it is judged whether or not a document in the input is relevant to the query 407. In the type model, it is judged whether or not a document in the input is an instruction document 408. Next, a linear interpolation technique may be used to combine the scores output from the two sub-models 405. The documents are then ranked in descending order of their combined scores 406.

As shown training data may be supplied in general to a training relevance model. However, training data is not needed with the exemplary Okapi BM25 model or other types of relevance models that may be utilized in place of Okapi BM25. In the example provided training data may also be supplied to the type model, however it is anticipated that in some applications training data may not be needed.

Relevance Model (Okapi)

Given a how-to query and a document, the relevance model finds a relevance score. In manuals search, for a given query, a list of <document, relevance_score> pairs using the relevance model to generate the relevance score are created. In the present example the Okapi BM25 relevance score may be employed as the relevance model. For indexing the title and the body of a document are indexed in separate fields. For each field, the Okapi BM25 weighting scheme is used to calculate a score. Then the scores of the title field and the body field are combined linearly, and the combined score is viewed as the relevance-score.

Type Model (Logistic Regression)

Given a document, the type model outputs a type score. That means that we assume that the type model is independent from queries. In manuals search, we create a list of <document, type_score> pairs using the type model.

We take a statistical machine learning approach to constructing a type model. More specifically, given a training data set $D=\{x_i, y_i\}_1^n$, we construct a model $Pr(y|x)$ that can minimize the error in predicting of y given x (generalization error). Here $x_i \in X$ and $y_i \in \{1,-1\}$. x represents a document and y represents whether or not a document is an instruction document. When applied to a new document x, the model predicts the corresponding y and outputs the score of the prediction. In this example, we adopt the Logistic Regression Model.

Logistic Regression

The Logistic Regression Model satisfies:

$$\log \frac{Pr(y=1|x)}{1-Pr(y=1|x)} = \beta_0 + \beta \cdot x \quad (1)$$

where $\beta$ represents the coefficients of a linear combination function and $\beta_0$ is the intercept. The Logistic Regression Model is usually estimated by using Maximum Likelihood.

The Logistic Regression Model assigns a probability to an instance (in our case a document) probability according to the following equation.

$$Pr(y=1|x) = \frac{1}{1+e^{-(\beta_0+\beta \cdot x)}} \quad (2)$$

We calculate the type-score of a document according to:

$$\text{type\_score} = \log \frac{Pr(y=1|x)}{1-Pr(y=1|x)} \quad (3)$$

Features

The Logistic Regression Model utilizes binary or real valued features as described below. Most features are created to characterize title, first heading and first sentence of documents. Although those skilled in the art will realize that in alternative examples features are not limited to characterizations of titles heading sentences and the like. Title is the text enclosed by the HTML tag '<title>' and '</title>'. Heading is the text enclosed by the HTML tag '<H1-6>' and '</H1-6>'. First heading refers to the first non-empty heading of a HTML document. First sentence is the first sentence appearing in the body of a HTML document.

'How To'

Whether or not the title of a document contains the words of 'how to', 'howto' or 'how-to' is an important indicator. This is represented using a binary feature. There are similar features with regard to the first heading and the first sentence of a document. Those skilled in the art will realize that in alternative examples of knowledge extraction other words or phrases of interest may be identified and used as important indicators.

'Doing Something'

The appearance of the suffix 'ing' in the first word of the title is another indicator of an instruction document. Sometimes people use the template of 'doing something' instead of 'how to do something' for the title of an instruction document. The value of the feature is binary, too. Similar features have also been defined for the first heading and the first sentence. Those skilled in the art will realize that other words or word fragments from the title may be used depending upon the specific application of search by using a relevance model and a type model.

Text Length

Also defined is the following real-valued feature:

$$\log(\text{length}(\text{title})+1) \quad (4)$$

where length(title) denotes the number of words in the title. A document with a short title (e.g. a one-word title) tends to be a non-instruction document. Similar features have also been defined for the first heading and the first sentence.

Identical Expressions

If the texts in any two of the three parts: title, first heading and first sentence are identical, then this feature is 1. Otherwise, it is 0. An instruction document usually repeats its topic in these three places.

Bag of Words

Also relied upon are 'bag-of-words' features. The method collects high frequency words in the titles of the documents in training data and create a bag of the keywords. Some keywords play positive roles (e.g., 'troubleshoot', 'wizards') and some negative ones (e.g., 'contact'). If the title of a document contains one of the keywords, then the corresponding feature will be 1, otherwise 0. Similar features have been defined for the first heading and the first sentence.

Combination of Relevance and Type Models

A ranking_score may be calculated by linearly interpolating the relevance_score and type_score as the Equation (5).

$$\text{ranking\_score} = \lambda \cdot \text{type\_score} + (1-\lambda) \cdot \text{relevance\_score} \quad (5)$$

Here, $\lambda \in [0,1]$ is a weight used to balance the contribution of the relevance model and the type model. As will be explained later it is typically better to have $\lambda=0.5$ In manuals search, documents are retrieved and ranked in descending order of the ranking_score.

In principle, given a query and a document collection, one can calculate the ranking score of each of the documents with respect to the query. In an implementation of the method, the top 100 documents ranked by the relevance model (Okapi) are first collected. Next ranking scores are calculated only for the top 100 documents. In this way, a manuals search may be conducted very efficiently.

Generalization

Manuals search may be formalized in a more general framework called 'typed search'. In typed search, documents are retrieved and ranked not only on the basis of relevance to the query, but also the likelihood of being the desired type. Given a query q and a document d, we calculate the ranking score of the pair using Equation (6):

$$Pr(r,t|q,d) \approx Pr(r|q,d) \cdot Pr(t|d) \qquad (6)$$

where r and t denote relevance and type, respectively. Both r and t are binary variables. In manual search, for example, t means that a document is an instruction document. In the equation, we make an assumption that r and t given a q and d are independent.

There are many 'types' that can be considered such as definition, letter, and home page, for example. In manuals search, one can define the relevance score and the type score as log odds of Pr(r|q,d) and Pr(t|d), respectively (cf., Equation (3)). This justifies why we make use of equal weight in the linear combination in Equation (5).

Kraajj et al. have proposed using Language Model in the task of home/named page finding. They employ a model as follows, which assigns a score to a page d given a query q:

$$Pr(d|q) \propto Pr(d) \cdot Pr(q|d) \qquad (7)$$

The first model on the right hand side of Equation (7), corresponds to the type model in Equation (6) and the second model corresponds to the relevance model. Therefore, home page finding can be viewed as a specialization of typed search. For further information on using a Language Model see W. Kraajj, T. Westerveld and D. Hiemstra. *The Importance of Prior Probabilities for Entry Page Search*. In Proc. of the 25th annual international ACM SIGIR conference on research and development in information retrieval, 2002. The contents of which are incorporated in this patent application in their entirety, Conclusions In manuals search the documents have been ranked by combining a relevance model and a type model. Okapi and Logistic Regression have been used as the relevance model and the type model, respectively. Final ranking scores are then obtained by linearly interpolating the scores from the two models. The proposed method may be generalized in a general framework called typed search.

Figure 5:
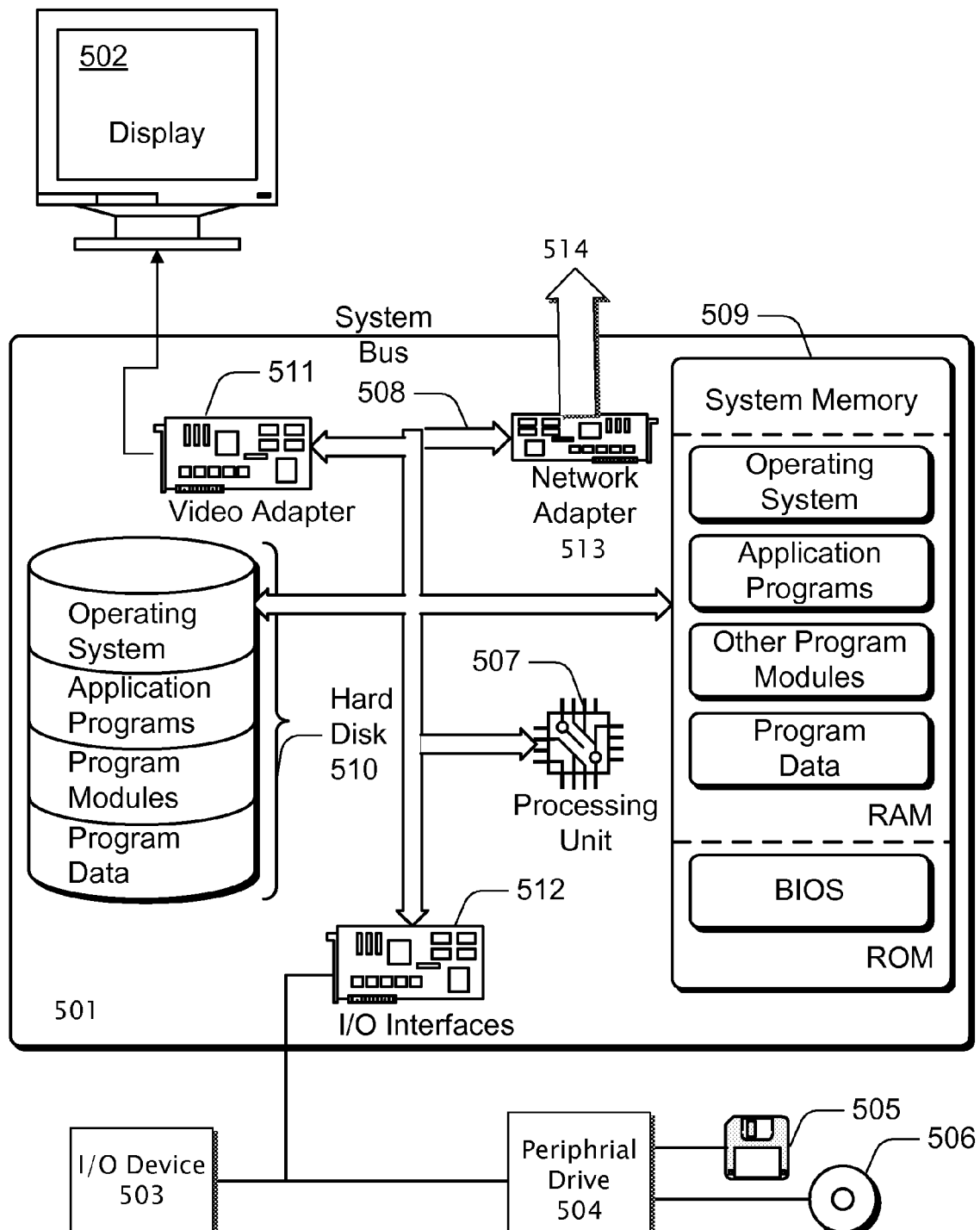
FIG. 5 illustrates an exemplary computing environment 500 in which the manuals search by using a relevance model and a type model described in this application, may be implemented.

FIG. 5 illustrates an exemplary computing environment 500 in which the manuals search by using a relevance model and a type model described in this application, may be implemented. Exemplary computing environment 500 is only one example of a computing system and is not intended to limit the examples described in this application to this particular computing environment.

For example the computing environment 500 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 500 includes a general-purpose computing system in the form of a computing device 501. The components of computing device 501 can include one or more processors (including CPUs, GPUs, microprocessors and the like) 507, a system memory 509, and a system bus 508 that couples the various system components. Processor 507 processes various computer executable instructions, including those to ** to control the operation of computing device 501 and to communicate with other electronic and computing devices (not shown). The system bus 508 represents any number of several types of bus structures, including a memory bus or memory controller, a peripheral bus, an accelerated graphics port, and a processor or local bus using any of a variety of bus architectures.

The system memory 509 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 507.

Mass storage devices 504 may be coupled to the computing device 501 or incorporated into the computing device by coupling to the buss. Such mass storage devices 504 may include a magnetic disk drive which reads from and writes to a removable, non volatile magnetic disk (e.g., a "floppy disk") 505, or an optical disk drive that reads from and/or writes to a removable, non-volatile optical disk such as a CD ROM or the like 506. Computer readable media 505, 506 typically embody computer readable instructions, data structures, program modules and the like supplied on floppy disks, CDs, portable memory sticks and the like.

Any number of program modules can be stored on the hard disk 510, Mass storage device 504, ROM and/or RAM 509, including by way of example, an operating system, one or more application programs, other program modules, and program data. Each of such operating system, application programs, other program modules and program data (or some combination thereof) may include an embodiment of the systems and methods described herein.

A display device 502 can be connected to the system bus 508 via an interface, such as a video adapter 511. A user can interface with computing device 702 via any number of different input devices 503 such as a keyboard, pointing device, joystick, game pad, serial port, and/or the like. These and other input devices are connected to the processors 507 via input/output interfaces 512 that are coupled to the system bus 508, but may be connected by other interface and bus structures, such as a parallel port, game port, and/or a universal serial bus (USB).

Computing device 500 can operate in a networked environment using connections to one or more remote computers through one or more local area networks (LANs), wide area networks (WANs) and the like. The computing device 501 is connected to a network 514 via a network adapter 513 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional tech-

The invention claimed is:

1. A method of searching by document type comprising:
receiving a search query having a topic type of the search query, the topic type comprising a type of topic to which the search query is directed;
ranking first matching documents according to relevance to the search query to form a ranked relevance list, wherein the ranking is performed by applying the search query to a relevancy model that was trained with training data comprising training data elements, a training data element comprising a previously-made query, a document satisfying the previously-made query, and corresponding information indicating relevancy of the document to the previously-made query, where the relevancy model is a statistical model that ranks the first matching documents;
for the same search query, ranking second matching documents according to topic type to form a ranked type list in which the second matching documents are ranked according to respective probabilities that their respective topic types match the topic type of the search query, and wherein the ranking is performed using a typing model that was trained with training data comprising training data elements, a training data element comprising a document and corresponding typing information indicating a topic type of the document, where the typing model is a statistical model that ranks the second matching documents according to the probabilities of their topic types matching the search query's topic type; and
using linear interpolation to interpolate the ranked relevance list and the ranked type list to form a list of documents from the relevance list and the ranked type list type, the list of documents being ranked based on both relevance and type, the list of documents including documents from the first matching documents and documents from the second matching documents.

2. The method of searching by document type of claim 1 in which ranking documents according to relevance to form a ranked relevance list is performed by a document relevance search.

3. The method of searching by document type of claim 2 in which the document relevance search is Okapi.

4. The method searching by document type of claim 1 in which ranking documents according to type to form a ranked type list is performed by a classifier.

5. The method searching by document type of claim 4 in which the classifier is logistic regression.

6. One or more computer-readable storage media storing information to enable a machine to perform a process, the process comprising:
receiving a search query having a topic type of the search query, the topic type comprising a type of topic to which the search query is directed;
ranking first matching documents according to relevance to the search query to form a ranked relevance list, wherein the ranking is performed by applying the search query to a relevancy model that was trained with training data comprising training data elements, a training data element comprising a previously-made query, a document satisfying the previously-made query, and corresponding information indicating relevancy of the document to the previously-made query, where the relevancy model is a statistical model that ranks the first matching documents;
for the same search query, ranking second matching documents according to topic type to form a ranked type list in which the second matching documents are ranked according to respective probabilities that their respective topic types match the topic type of the search query, and wherein the ranking is performed using a typing model that was trained with training data comprising training data elements, a training data element comprising a document and corresponding typing information indicating a topic type of the document, where the typing model is a statistical model that ranks the second matching documents according to the probabilities of their topic types matching the search query's topic type; and
using linear interpolation to interpolate the ranked relevance list and the ranked type list to form a list of documents from the relevance list and the ranked type list type, the list of documents being ranked based on both relevance and type, the list of documents including documents from the first matching documents and documents from the second matching documents.

* * * * *